Nov. 13, 1956 W. J. DERNER 2,770,506
LUBRICATION MEANS
Filed Dec. 29, 1952

INVENTOR
William J. Derner
BY
Willits, Helwig & Baillio
ATTORNEYS

United States Patent Office 2,770,506
Patented Nov. 13, 1956

2,770,506

LUBRICATION MEANS

William J. Derner, La Grange, Ill., assignor to General Motors Corporation, Detroit, Mich., a corporation of Delaware Application December 29, 1952, Serial No. 328,478

3 Claims. (Cl. 308—187)

This invention relates generally to lubrication means and more particularly to oil mist lubrication means for bearing assemblies supporting rapidly rotating shafts.

It is often desirable to use oil mist for lubricating the different types of bearing assemblies because the oil mist may be supplied to the bearings with just the right uniformity to achieve good lubrication while using a minimum of oil. However, when attempting to use this type of lubrication with very rapidly rotating shafts, difficulty has been encountered in getting proper lubrication because of the turbulence created by the high velocity of the rotating shaft and bearings, especially when the pressure which supplies the oil mist of necessity must be relatively low and substantially constant.

It, therefore, becomes an object of this invention to provide a lubrication means which allows small amounts of oil mist to be supplied at relatively low pressures for lubricating the bearing assemblies of high rotational velocity shafts.

This invention accomplishes the above stated object by positioning an arcuate shaped baffle having a pocket formed therebehind in the bearing cavity and immediately adjacent the bearing assembly. By positioning this baffle immediately adjacent the bearing assembly the turbulence created by the rotating bearing assembly is overcome and the oil mist is forced to pass between the various elements making up the bearing assembly.

The invention will be described in connection with the armature bearings for an electrical traction motor which is used to drive a diesel electric locomotive and as may be seen in the drawings.

Figure 1:
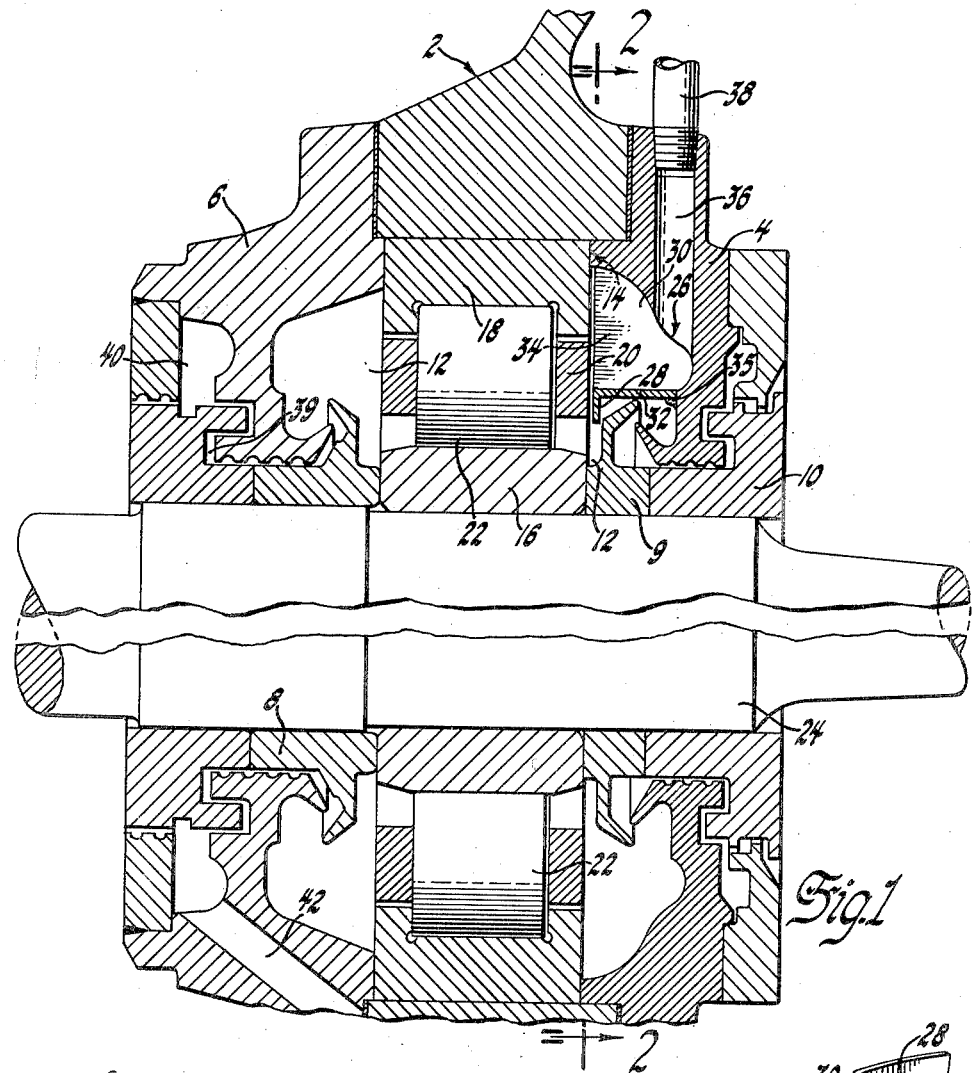
Figure 1 shows, in section, a portion of a traction motor housing having the usual bearing assembly contained in a cavity formed therein with the new baffle means positioned immediately adjacent the bearing assembly.
Figures 2, 3:
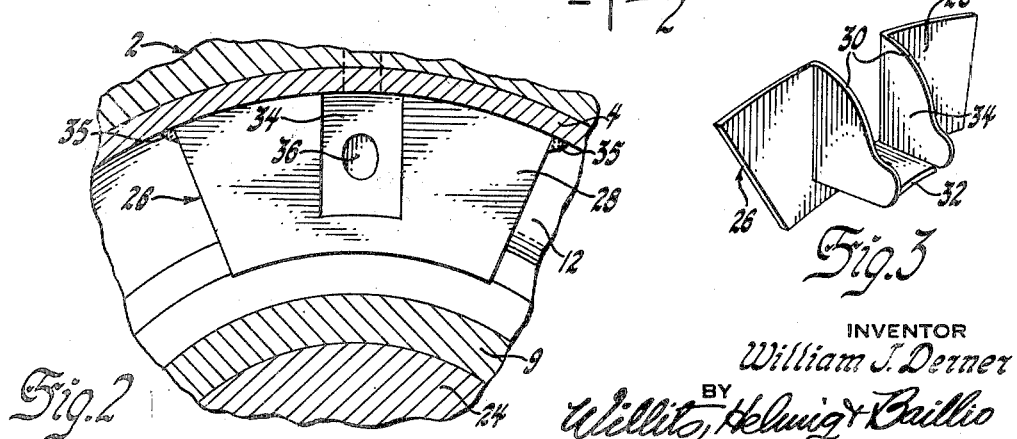
Figure 2 is a view taken on the line 2—2 of Figure 1 showing the arcuate shape of this baffle and the open pocket formed therebehind.
Figure 3 is a perspective view of the baffle configuration showing the manner in which the pocket shown in Figure 2 is formed.

Referring now to the accompanying drawing, the part of the traction housing shown is indicated generally by the numeral 2. Formed in a wall of this housing 2 by a pair of bearing retaining rings 4 and 6 and the spacers 8, 9 and 10 is a bearing cavity 12. Retained within the bearing cavity 12 by the retaining rings 4 and 6 and the spacers 8 and 9 is a bearing assembly indicated generally by the numeral 14. The bearing assembly 14 comprises an inner race 16, an outer race 18, a cage 20, and a plurality of roller bearings 22. Supported by the bearing assembly 14 and extending through the inner race 16 is a traction motor armature shaft 24 on which the aforementioned spacers 8, 9 and 10 are placed.

Positioned within the bearing cavity 12 and immediately adjacent the bearing assembly 14 is the new baffle means 26. This baffle means 26 has a flat portion 28 which is essentially arcuate in shape. Formed on one side of the flat section 28 by means of side walls 30 and a bottom 32 is a pocket 34. As shown in Figure 1, when the baffle 26 is positioned in the bearing cavity 12 the sides 30 and the bottom 32 cooperate with inner surfaces of the retaining ring 4 to further enclose the pocket 34. The baffle 26 may be secured to the inner surfaces on the retaining ring 4 by any suitable fastening means such as the tack welds 35. Leading from the back side of the pocket 34 is a passage 36 which may be connected to a suitable conductor 38 for supplying oil mist to the pocket 34.

In operation, oil mist under relatively low pressure is supplied by means of the conductor 38 and the passage 36 to the pocket 34 from which it passes to the flat outer surface of the arcuate shaped section 28 of the baffle 26. Due to the proximity of this baffle relative to the bearing assembly 14 very little turbulent air will enter between the flat outer surface of the baffle and the ends of the aforementioned elements making up the bearing assembly. Without turbulence to prevent its entry oil mist will enter between the inner and outer races 14 and 16 as well as the cage 20 and the roller bearings 22 and pass through to the opposite side of the bearing cavity 12. The oil mist may then pass along a corrugated surface of the bearing retaining ring 6 forming a labyrinth seal 39 to a chamber 40 whence it may be exhausted to the atmosphere by means of a passage 42.

It will be appreciated that this baffle means will provide suitable oil mist lubrication for the bearing assemblies 14 regardless of the direction of rotation of the armature shaft 24 since the flat portion 28 of the baffle 26 extends arcuately for equal distances on either side of the pocket 34 to which the oil mist is supplied.

I claim:

1. A motor bearing having lubrication means therefor including a housing having a bearing cavity formed therein, a bearing assembly positioned within said cavity, said bearing assembly including an inner race, an outer race, and a cage positioned between said races and rotatably retaining a plurality of roller bearings therebetween, a rotatable shaft supported by the inner of said races, means to conduct oil mist to said cavity, and an arcuate shaped baffle having a substantially flat surface portion and an open pocket communicating with said means to conduct oil mist to said cavity, said arcuate shaped baffle being positioned within said cavity so that said flat surface portion is immediately adjacent end faces of said inner and outer races and said cage and roller bearings to direct oil mist between said races, said cage, and said rollers to effect lubrication thereof.

2. A traction motor housing having a bearing cavity formed therein, inner and outer races positioned within said cavity, a bearing cage having roller bearings rotatably retained therein and positioned between said races, a traction motor armature shaft supported by the inner of said races, and means to effect lubrication of said roller bearings and cage and said inner and outer races by directing oil mist therebetween, said means including an arcuate shaped baffle positioned in said cavity and having a pocket formed therewith, said baffle having a substantially flat surface portion immediately adjacent end faces of said races, roller bearings and cages and substantially parallel to said end faces, said flat surface portion extending arcuately for equal distances on either side of said pocket, and means to supply oil mist to said pocket.

3. A bearing having lubrication means therefor including a housing having an annular bearing cavity formed therein, a bearing assembly positioned within said cavity, said bearing assembly including inner and outer bearing surfaces having antifriction bearing elements therebetween, means to conduct lubricant to said cavity to completely fill said cavity therewith, and a baffle having an open pocket communicating with said means to conduct lubricant to said cavity, said baffle having a substantially flat portion of less surface area than an annular wall of said cavity, said flat portion being spaced from the opposite walls forming said cavity so that lubricant is on either side of said flat portion, one surface of said portion being immediately adjacent said elements and said inner and outer bearing surfaces to direct lubricant between said bearing surfaces and on said elements.

References Cited in the file of this patent

UNITED STATES PATENTS

| | | |
|---|---|---|
| 1,798,139 | Boland | Mar. 31, 1931 |
| 1,893,995 | Jung | Jan. 10, 1933 |
| 2,109,766 | Bullard | Mar. 1, 1938 |
| 2,334,942 | Malone | Nov. 23, 1943 |

FOREIGN PATENTS

| | | |
|---|---|---|
| 582,903 | France | Dec. 31, 1924 |